US009304965B2

(12) United States Patent
Kim et al.

(10) Patent No.: US 9,304,965 B2
(45) Date of Patent: Apr. 5, 2016

(54) SCHEDULING APPARATUS AND METHOD FOR LOAD BALANCING WHEN PERFORMING MULTIPLE TRANSCODING OPERATIONS

(71) Applicants: Samsung Electronics Co., Ltd., Gyeonggi-do (KR); Industry-Academic Cooperation Foundation, Yonsei University, Seoul (KR)

(72) Inventors: Jae-Ho Kim, Seoul (KR); Sun-Mi Kim, Seoul (KR); Won Woo Ro, Seoul (KR); Changmin Lee, Seoul (KR); Wonseb Jeong, Seoul (KR); Jin-Won Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 341 days.

(21) Appl. No.: 13/848,622

(22) Filed: Mar. 21, 2013

(65) Prior Publication Data

US 2013/0254386 A1    Sep. 26, 2013

(30) Foreign Application Priority Data

Mar. 26, 2012    (KR) .................. 10-2012-0030702

(51) Int. Cl.
```
G06F 15/173    (2006.01)
H04L 29/08     (2006.01)
H04L 29/06     (2006.01)
```
(52) U.S. Cl.
CPC ............ G06F 15/173 (2013.01); H04L 67/322 (2013.01); H04L 69/24 (2013.01)

(58) Field of Classification Search
None
See application file for complete search history.

(56) References Cited

U.S. PATENT DOCUMENTS

| 7,111,058    | B1   |   9/2006 | Nguyen et al. |
|--------------|------|----------|---------------|
| 7,818,355    | B2 * |  10/2010 | Mills et al. .................... 709/203 |
| 2005/0021726 | A1 * |   1/2005 | Denoual ....................... 709/223 |
| 2006/0140591 | A1   |   6/2006 | Estevez et al. |
| 2008/0155230 | A1   |   6/2008 | Robbins et al. |
| 2009/0172685 | A1   |   7/2009 | Shavit |
| 2010/0135417 | A1 * |   6/2010 | Hargil ..................... 375/240.25 |
| 2010/0205318 | A1   |   8/2010 | Melnyk et al. |
| 2013/0205002 | A1 * |   8/2013 | Wang et al. ................... 709/224 |

FOREIGN PATENT DOCUMENTS

KR         10-0844816 B1      7/2008

OTHER PUBLICATIONS

International Search Report dated Jul. 25, 2013 in connection with International Patent Application No. PCT/KR2013/002027, 3 pages.
Written Opinion of the International Searching Authority dated Jul. 25, 2013, in connection with International Patent Application No. PCT/KR2013/002027, 4 pages.

* cited by examiner

Primary Examiner — Ryan Jakovac

(57) ABSTRACT

According to one embodiment, a scheduling method for load balancing in an electronic device such as a server when performing multiple transcoding operations includes performing a first transcoding operation in order to transmit at least one moving image file to a first terminal. The server receives a request from a second terminal to transmit at least one moving image file while performing the first transcoding. The server performs a second transcoding operation in order to transmit the requested moving image file to the second terminal. The server monitors output frame rates of the first transcoding operation and the second transcoding operation, to control the output frame rates.

14 Claims, 7 Drawing Sheets

SCHEDULING APPARATUS AND METHOD FOR LOAD BALANCING WHEN PERFORMING MULTIPLE TRANSCODING OPERATIONS

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 26, 2012 and assigned Serial No. 10-2012-0030702, the entire disclosure of which is hereby incorporated by reference.

TECHNICAL FIELD OF THE INVENTION

The present invention generally relates to communication devices, and more particularly, to an apparatus and method for load balancing when performing multiple transcoding operations.

BACKGROUND OF THE INVENTION

As network technology increases, clients may transmit various content to servers, store the same in the servers, and receive content stored in the server at a desired time and place to display the same.

However, for these servers to transmit content to clients, a format of content stored in the server should coincide with a format of each client. That is, where the format of the content stored in the servers do not coincide with the format of the clients that have requested the relevant content, the servers should perform transcoding operations for matching the format to each client. Therefore, when requested by multiple clients to transmit content stored in the servers while performing one transcoding operation, the servers should also perform multiple levels of transcoding.

However, according to the conventional art, where servers perform multiple transcoding operations, an amount of operations of transcoding may vary depending on a request from the client, so that the server cannot perform fast, efficient content transmission to respective clients. That is, where the server performs multiple transcoding in order to transmit content desired by respective clients to these clients, non-uniform output frame rate may occur.

SUMMARY OF THE INVENTION

To address the above-discussed deficiencies of the prior art, it is a primary object to provide an apparatus and a method for load balancing when performing multiple transcoding operations.

Another aspect of the present invention is to provide an apparatus and a method for monitoring output frame rates of multiple transcoding operations in real-time to control an output frame rate.

Still another aspect of the present invention is to provide an apparatus and a method for efficiently distributing a limited transcoding operation capability.

Other aspects, advantages and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication devices. The following description with reference to the accompanying drawings is provided to assist in a comprehensive understanding of example embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of example embodiments of the present invention are provided for illustration purpose only and not for the purpose of limiting the invention as defined by the appended claims and their equivalents.

Embodiments of the present invention provide an apparatus and a method for transcoding.

Figure 1:
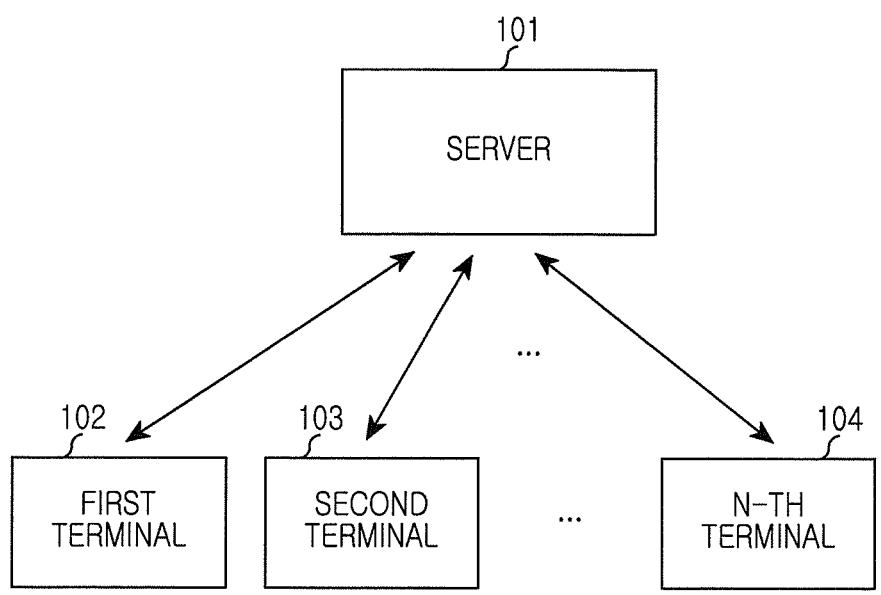
FIG. 1 illustrates an example server and a plurality of terminals according to an embodiment of the present invention.

FIG. 1 illustrates an example server and a plurality of terminals according to an embodiment of the present invention. As illustrated in FIG. 1, the server 101 and the plurality of terminals 102 and 103 are connected via a network, and the like to transmit/receive specific content from each other. Hereinafter, a process for, when a server is requested by at least two or more terminals to transmit at least one moving image file, transmitting the relevant moving image file to the respective terminals is described in detail with emphasis on a characteristic of one or more embodiments of the present invention.

First, when the server 101 is requested by the first terminal 102 to transmit at least one moving image file, the server 101 determines detailed information of the requested moving image file. Here, the detailed information of the moving image file denotes a format of the moving image file. For example, the format may include a type of CODEC, an image size, a bit rate, and the like. That is, the server 101 determines the detailed information of the moving image file requested by the first terminal 102 in order to determine whether the first terminal 102 can reproduce the transmitted moving image file when immediately transmitting the relevant moving image stored in the server 101 to the first terminal 102. If the format of the moving image file stored in the server 101 does not coincide with the format of the terminal 102, the server 101 performs transcoding in order to match the format of the moving image file with the format of the first terminal 102. Here, the transcoding generally refers to converting the format of the moving image file stored in the server 101 to the format requested by the first terminal 102. For example, the transcoding denotes converting a type of CODEC, an image size, a bit rate, and the like. to those requested by the first terminal 102.

If the server 101 determines that the format of the moving image file stored in the server 101 does not coincide with the format of the first terminal 102, the server 101 starts transcoding in order to match the format of the stored moving image file with the format of the first terminal 102. As described above, while performing transcoding in order to match the format of the moving image file stored in the server 101 with the format of the first terminal 102, the server 101 may be requested by the second terminal 103, which is a different terminal, to transmit at least one moving image file. When the server 101 is requested by the second terminal 103 to transmit at least one moving image file, the server 101 determines detailed information of the requested moving image file. When determining that the format of the moving image file stored in the server 101 does not coincide with the format of the second terminal 103, the server 101 performs transcoding in order to match the format of the stored moving image file with the format of the second terminal 103. That is, the server 101 performs multiple transcoding operations simultaneously. More specifically, the server 101 performs a first transcoding operation in order to match the format of the stored moving image file with the format of the first terminal 102, and simultaneously, performs a second transcoding operation in order to match the format of the stored moving image file with the format of the second terminal 103.

In the above-described example, the server 101 monitors an output frame rate generated as a result of the first transcoding operation and an output frame rate generated as a result of the second transcoding operation in real-time. First, the server 101 calculates average values of the output frame rates generated as a result of the first transcoding operation and the output frame rates generated as a result of the second transcoding operation within a specified time. After that, the server compares a minimum output frame rate with average values of the respective calculated output frame rates. When determining that one of the respective calculated output frame rates is less than the minimum output frame rate, the server 101 reduces a size of a portion of an output frame rate determined to be greater than the minimum output frame rate by a rate specified by a user. In contrast, the server 101 increases a size of a portion of an output frame rate determined less than the minimum output frame rate by the reduced rate. Here, the minimum output frame rate denotes a minimum value of an output frame rate for transmitting a requested moving image file to a terminal that has requested at least one moving image file. That is, where an output frame rate generated as a result of transcoding in the server is less than the minimum output frame rate, the server cannot transmit the relevant moving image file to the terminal that has requested the specific moving image file. Also, the portion is used as a unit for transferring data to a network layer, and a basic data unit of transcoding.

If the server determines that all average values of output frame rates generated as a result of the first transcoding operation and the second transcoding operation are greater than the minimum output frame rate, the server may control respective output frame rates to the same value. For example, suppose that the minimum output frame rate is 30, the average value of the output frame rates as a result of the first transcoding operation is 60, and the average value of the output frame rates as a result of the second transcoding operation is 80. The server controls respective output frame rates, and may control the average value of the output frame rates generated as a result of the first transcoding operation and the average value of the output frame rates generated as a result of the second transcoding operation to coincide with each other as 70. That is, the server may generate an output frame rate such that the output frame rate is uniform over all terminals coupled to the server. Also, where the server is requested by a third terminal and a fourth terminal to transmit a moving image file, the server performs a third transcoding operation and a fourth transcoding operation.

In the conventional art, in the case where the server is requested by multiple terminals to transmit at least one moving image file and perform multiple transcoding operations, non-uniformity in respective output frame rates may be generated. More specifically, since a level of operations of transcoding that can be performed by the server is limited, while a level of operations required by respective terminals may not be constant, output frame rates generated as a result of respective transcoding may not be uniform in the server. However, according to embodiments of the present invention, the server controls respective output frame rates generated as a result of multiple transcoding operations to be uniform, thereby efficiently distributing an operation of transcoding.

Figure 2:
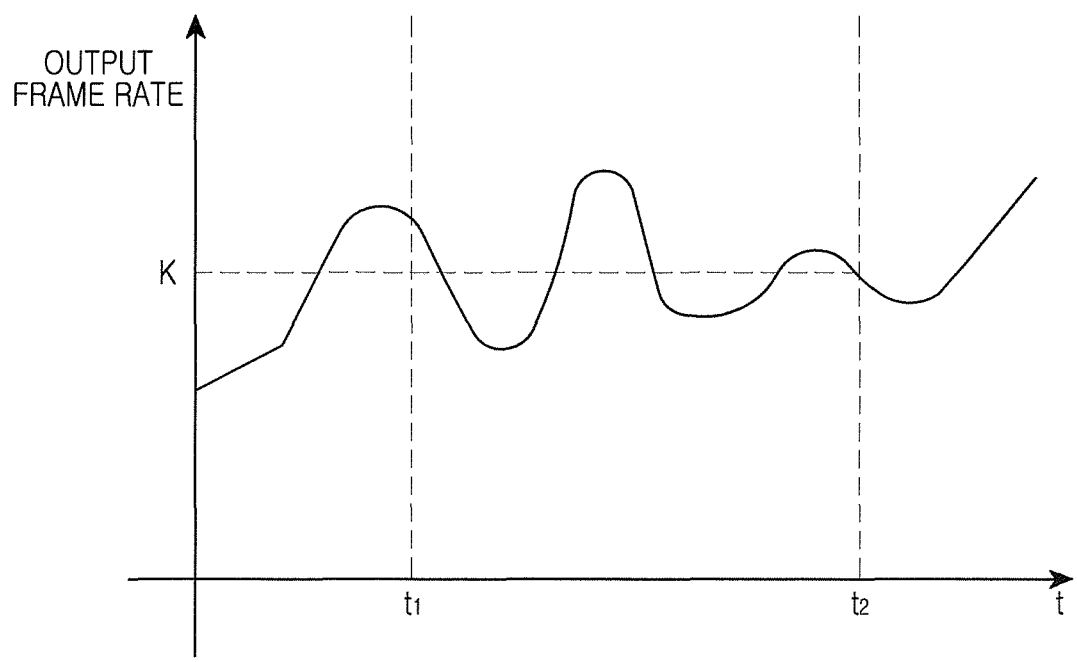
FIG. 2 illustrates an example graph that calculates an average value of output frame rates according to an embodiment of the present invention.

FIG. 2 illustrates an example calculation of an average value of output frame rates according to an embodiment of the present invention. First, where the server is requested by a terminal to transmit at least one moving image file, the server determines detailed information of the moving image file requested by the terminal. Here, the detailed information of the moving image file denotes a format of the moving image file. For example, the format may include a type of CODEC, an image size, a bit rate, and the like. If the format of the moving image file stored in the server does not coincide with the format of the terminal, the server performs transcoding in order to match the format of the moving image file with the format of the terminal. Here, the transcoding denotes converting the format of the moving image file stored in the server to the format requested by the terminal. For example, the transcoding denotes converting a type of CODEC, an image size, a bit rate, and the like, to those requested by the terminal. If the server determines that the format of the moving image file stored in the server does not coincide with the format of the terminal, the server starts transcoding in order to match the format of the stored moving image file with the format of the terminal.

When the server starts transcoding, an output frame rate occurs. As illustrated in FIG. 2, a substantial output frame rate does not have a constant value. A value of the output frame rate illustrated in FIG. 2 is not an experimentally measured value but an example illustrated value. Hereinafter, a method for calculating an average output frame rate at the server is described in detail using the graph illustrated in FIG. 2 as an example. First, an x-axis of the graph represents time and a y-axis represents an output frame rate. That is, the graph illustrates an output frame rate value as a function of time. To calculate an average output frame rate value, a specified time should be given. More specifically, an average value of output frame rates is derived for time specified by a user. A section from t1 to t2 illustrated in FIG. 2 is a specified time. t1 is a time at which the specified time starts, and t2 is a time at which the specified time ends. Therefore, when an average value of output frame rates during the section between t1 and t2 is obtained, an average value of output frame rate values may be immediately calculated. That is, assuming that an average value of values appearing on y-axis between t1 and t2 is k, the very k value becomes an average value of the output frame rates. The average value of the output frame rates calculated by the above method is used when it is compared with a minimum output frame rate, and is used as each output frame rate value while the server performs multiple transcoding operations.

Figure 3A:
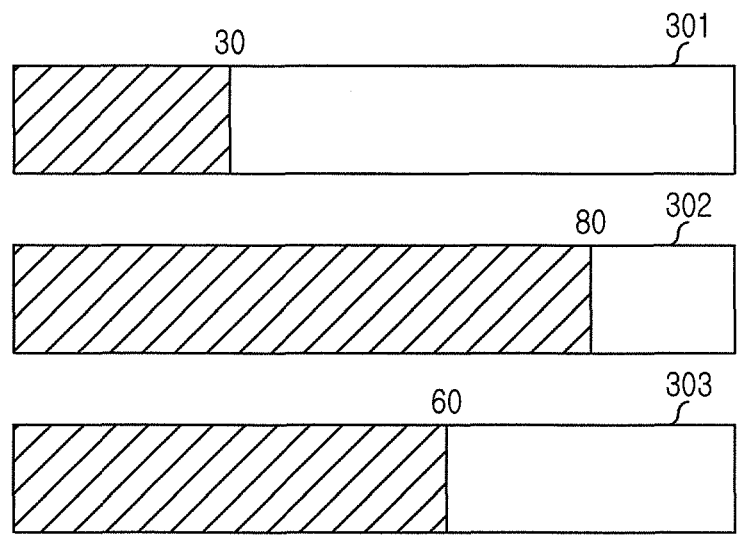
FIGS. 3A and 3B illustrate examples of controlling an output frame rate when performing multiple transcoding operations according to an embodiment of the present invention.
Figure 3B:
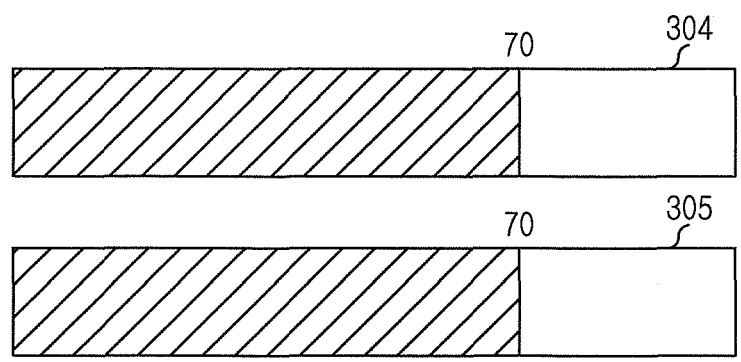

FIGS. 3A and 3B illustrates examples of controlling an output frame rate when performing multiple transcoding operations according to an embodiment of the present invention. Hereinafter, description is made on the assumption that the server is requested by the first terminal and the second terminal to transmit at least one moving image file, and perform multiple transcoding operations. First, three graphs 301, 302, 303 illustrated in FIG. 3A illustrate output frame rates before the output frame rates are controlled by the server. The first graph 301 illustrates a minimum frame rate value. Here, the minimum output frame rate denotes a minimum value of an output frame rate for transmitting a requested moving image file to a terminal that has requested at least one moving image file. That is, where an output frame rate value generated as a result of transcoding in the server is less than the minimum output frame rate, the server cannot transmit the relevant moving image file to the terminal that has requested the specific moving image file. Therefore, the output frame rate generated as a result of transcoding in the server should be greater than the minimum output frame rate. The second graph 302 illustrates an output frame rate value generated as a result of the first transcoding operation, and the third graph 303 illustrates an output frame rate value generated as a result of the second transcoding operation.

First, where the server is requested by the first terminal to transmit at least one moving image file, the server determines detailed information of the moving image file requested by the first terminal. If the server determines that the format of the moving image file stored in the server does not coincide with the format of the first terminal, the server starts transcoding in order to match the format of the stored moving image file with the format of the first terminal. After that, when requested by the second terminal to transmit at least one moving image file while performing the first transcoding, the server determines detailed information of the requested moving image file. When determining that the format of the moving image file stored in the server does not coincide with the format of the second terminal, the server performs a second transcoding operation in order to match the format of the stored moving image file with the format of the second terminal. That is, the server performs the first transcoding operation and the second transcoding operation simultaneously. More specifically, the server performs the first transcoding operation in order to match the format of the stored moving image file with the format of the first terminal, and simultaneously perform the second transcoding operation in order to match the format of the stored moving image file with the format of the second terminal.

For example, as illustrated in FIG. 3A, it is known that an initial output frame rate is 30 frames, an output frame rate generated as a result of the first transcoding operation performed by the server is 80 frames, and an output the frame rate generated as a result of the second transcoding operation performed by the server is 60 frames. That is, what is determined via the graphs illustrated in FIG. 3A is that there is no value less than 30 frames, which is the minimum output frame rate, among respective output frame rates generated as a result of the first transcoding operation and the second transcoding operation. Also, it is expected that the server may transmit the specific moving image file requested by the first terminal before transmitting the moving image file requested by the second terminal because the output frame rate generated as a result of the first transcoding operation is greater by 20 frames. Of course, a communication environment is a fluid concept that is not uniformly fixed but may change in real-time, but if a current communication environment is maintained, the first transcoding operation will end first before the second transcoding operation ends.

Two graphs 304 and 305 in FIG. 3B illustrate a case of matching an output frame rate value generated as a result of the first transcoding operation with an output frame rate value generated as a result of the second transcoding operation. In the above embodiment, since the output frame rate value generated as a result of the first transcoding operation and the output frame rate value generated as a result of the second transcoding operation are greater than the minimum output frame rate value, the server may immediately transmit the relevant moving image files to the first terminal and the second terminal, respectively, without matching the respective output frame rate values with each other, but may match the respective output frame rate values with each other as in the present embodiment. In the present embodiment, the server may match 80 frames, which is the output frame rate value generated as a result of the first transcoding operation, with 70 frames, and match 60 frames, which is the output frame rate value generated as a result of the second transcoding operation, with 70 frames, thereby outputting the matched output frame rate values of 70 frames. Therefore, since the same output frame rates are generated, the server has an advantage of uniformly transmitting the moving image files requested by the relevant terminals to the first terminal and the second terminal.

Figure 4A:
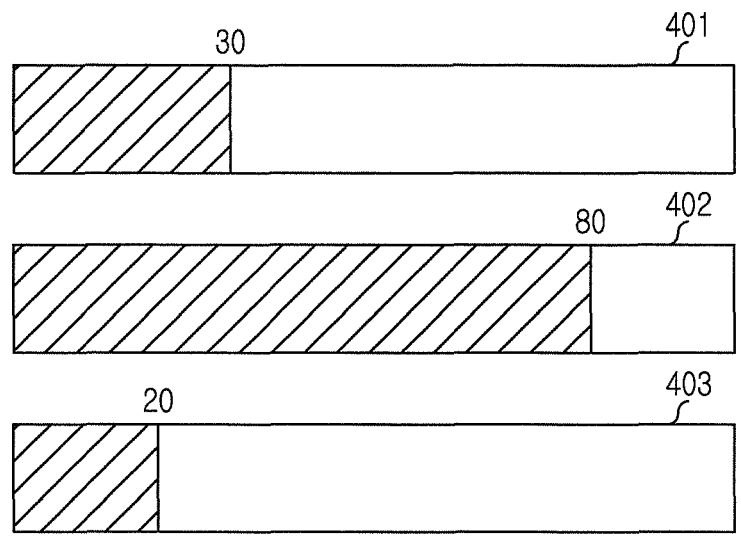
FIGS. 4A and 4B illustrate examples of controlling an output frame rate when performing multiple transcoding operations according to another embodiment of the present invention.
Figure 4B:
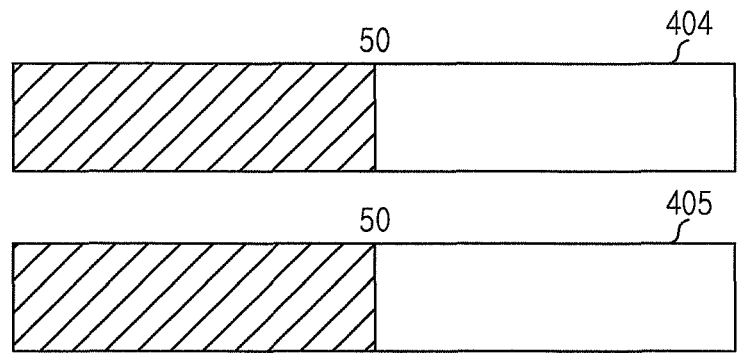

FIGS. 4A and 4B illustrate examples of controlling an output frame rate when performing multiple transcoding operations according to another embodiment of the present invention. Hereinafter, description is made on the assumption that the server is requested by the first terminal and the second terminal to transmit at least one moving image file and perform multiple transcoding operations. First, three graphs illustrated in FIG. 4A illustrate output frame rate values before the output frame rate values are controlled by the server. The first graph 401 illustrates a minimum frame rate value. Here, the minimum output frame rate denotes a minimum value of an output frame rate for transmitting a requested moving image file to a terminal that has requested at least one moving image file. That is, in the case where an output frame rate generated as a result of transcoding in the server is less than the minimum output frame rate, the server cannot transmit the relevant moving image file to the terminal that has requested the specific moving image file. Therefore, the output frame rate generated as a result of transcoding in the server should be greater than the minimum output frame rate. The second graph 402 illustrates an output frame rate value generated as a result of the first transcoding operation, and the third graph 403 illustrates an output frame rate value generated as a result of the second transcoding operation.

First, where the server is requested by the first terminal to transmit at least one moving image file, the server determines detailed information of the moving image file requested by the first terminal. If the server determines that the format of the moving image file stored in the server does not coincide with the format of the first terminal, the server starts transcoding in order to match the format of the stored moving image file with the format of the first terminal. After that, when requested by the second terminal to transmit at least one moving image file while performing the first transcoding operation, the server determines detailed information of the requested moving image file. When determining that the format of the moving image file stored in the server does not coincide with the format of the second terminal, the server performs a second transcoding operation in order to match the format of the stored moving image file with the format of the second terminal. That is, the server performs the first transcoding operation and the second transcoding operation simultaneously. More specifically, the server performs the first transcoding operation in order to match the format of the stored moving image file with the format of the first terminal, and simultaneously performs the second transcoding operation in order to match the format of the stored moving image file with the format of the second terminal.

For example, as illustrated in FIG. 4A, it is known that an initial output frame rate is 30 frames, an output frame rate generated as a result of the first transcoding operation performed by the server is 80 frames, and an output frame rate generated as a result of the second transcoding operation performed by the server is 20 frames. That is, it is known that among the output frame rates generated as a result of the first transcoding operation and the second transcoding operation, the output frame rate generated as a result of the second transcoding operation is less than 30 frames, which is the minimum output frame rate. Therefore, if the respective output frame rate values are not controlled, the server cannot transmit the relevant moving image file requested by the second terminal to the second terminal under the current state. Of course, since a communication environment improves after the server transmits the moving image file requested by the first terminal to the first terminal completely, the server may transmit the relevant moving, image file to the second terminal. However, though description has been made on a case where only two terminals of the first terminal and the second terminal access the server in order to easily describe the present invention, the server may be requested by many terminals to transmit specific moving image files and simultaneously perform multiple transcoding operations greater than the above embodiment in an actual communication environment. Therefore, the server may effectively control the first transcoding operation and the second transcoding operation in order to transmit the specific moving image file requested by the second terminal to the second terminal.

Two graphs 404 and 405 in FIG. 4B illustrate an embodiment of matching an output frame rate value generated as a result of the first transcoding operation with an output frame rate value generated as a result of the second transcoding operation. In the above embodiment, the output frame rate value generated as a result of the first transcoding operation has a frame rate value greater than the minimum output frame rate value, but the output frame rate value generated as a result of the second transcoding operation has a frame rate value less than the minimum output frame rate value. Therefore, the server controls respective output frame rate values and matches the respective output frame rate values with 50 frames. More specifically, the server reduces 80 frames generated as a result of the first transcoding operation by a 30-frame value, and adds the reduced 30-frame value to 20 frames generated as a result of the second transcoding operation to control the output frame rate values to a 50-frame value. That is, the first transcoding operation has the output frame rate value of 80 frames before the first transcoding operation is controlled by the server, but is controlled to an output frame rate value of a 50-frame value. Also, the second transcoding operation has the output frame rate value of 20 frames less than the initial output frame rate value before the second transcoding operation is controlled by the server, but is controlled to an output frame rate value of a 50-frame value after being controlled by the server. Therefore, the server lowers an occupy ratio allocated to the first terminal and increases an occupy ratio allocated to the second terminal where communication is not fast, thereby uniformly transmitting the moving image files requested by the relevant terminals to the first terminal and the second terminal, respectively.

Figure 5A:
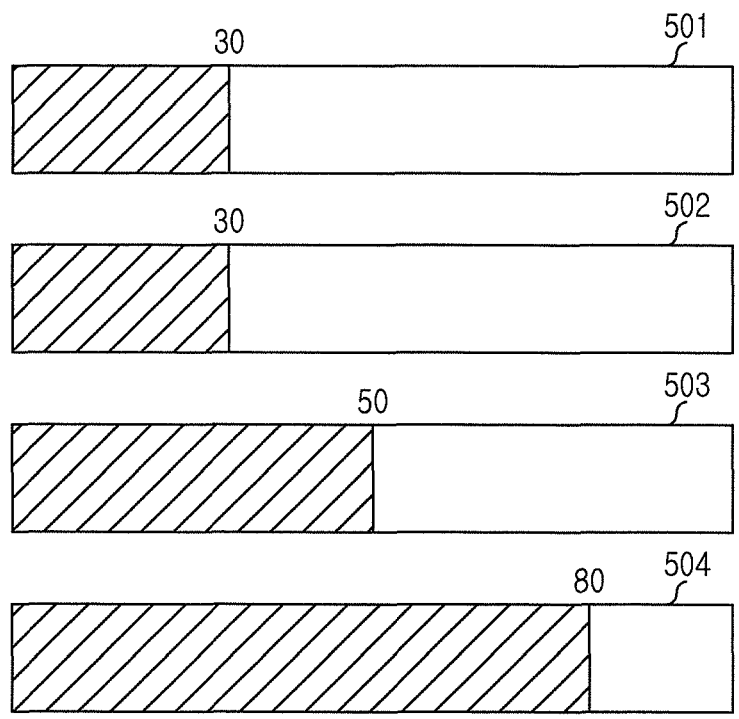
FIGS. 5A and 5B illustrate examples of controlling an output frame rate when performing multiple transcoding operations according to further another embodiment of the present invention.
Figure 5B:
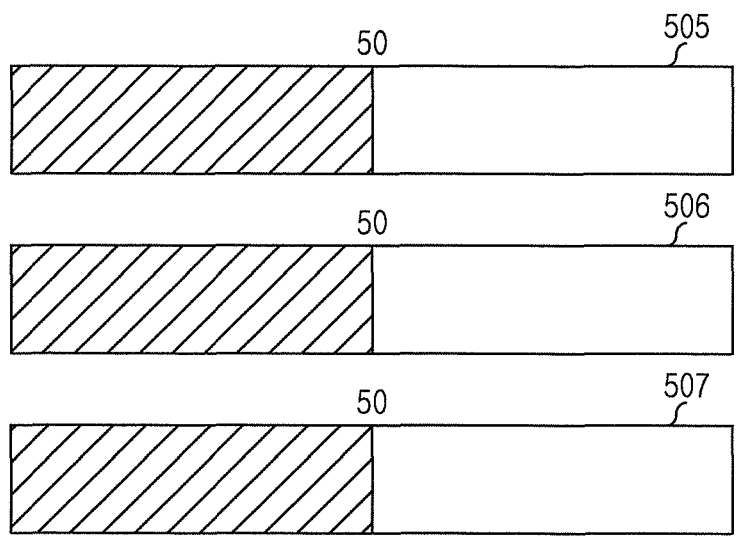

FIGS. 5A and 5B illustrate examples of controlling an output frame rate when performing multiple transcoding operations according to further another embodiment of the present invention. Hereinafter, description is made on the assumption that the server is requested by the first terminal, the second terminal, and the third terminal to transmit at least one moving image file and perform multiple transcoding operations. First, four graphs 501, 502, 503, 504 illustrated in FIG. 5A illustrate output frame rate values before the output frame rate values are controlled by the server. The first graph 501 illustrates a minimum frame rate value, the second graph 502 illustrates an output frame rate value generated as a result of the first transcoding operation, the third graph 503 illustrates an output frame rate value generated as a result of the second transcoding operation, and the fourth graph 504 illustrates an output frame rate value generated as a result of the third transcoding operation.

First, where the server is requested by the first terminal to transmit at least one moving image file, the server determines detailed information of the moving image file requested by the first terminal. If the server determines that the format of the moving image file stored in the server does not coincide with the format of the first terminal, the server starts transcoding in order to match the format of the stored moving image file with the format of the first terminal. After that, when requested by the second terminal to transmit at least one moving image file while performing the first transcoding operation, the server determines detailed information of the requested moving image file. When determining that the format of the moving image file stored in the server does not coincide with the format of the second terminal, the server performs the second transcoding operation in order to match the format of the stored moving image file with the format of the second terminal. Also, when requested by the third terminal to transmit at least one moving image file while performing the first transcoding operation and the second transcoding operation, the server determines detailed information of the requested moving image file. When determining that the format of the moving image file stored in the server does not coincide with the format of the third terminal, the server performs the third transcoding operation in order to match the format of the stored moving image file with the format of the third terminal. That is, the server performs the first transcoding operation, the second transcoding operation, and the third transcoding operation simultaneously. More specifically, the server performs the first transcoding operation in order to match the format of the stored moving image file with the format of the first terminal, performs the second transcoding operation in order to match the format of the stored moving image file with the format of the second terminal, and performs the third transcoding operation in order to match the format of the stored moving image file with the format of the third terminal, simultaneously.

For example, as illustrated in FIG. 5A, it is known that the minimum output frame rate is 30 frames, an output frame rate generated as a result of the first transcoding operation is 20 frames, an output frame rate generated as a result of the second transcoding operation is 50 frames, and an output frame rate generated as a result of the third transcoding operation is 80 frames. That is, it is known that among respective output frame rates generated as a result of the first transcoding operation, the second transcoding operation, and the third transcoding operation, the output frame rate generated as a result of the first transcoding operation is less than 30 frames, which is the minimum output frame rate. Therefore, if the respective output frame rate values are not controlled, the server cannot transmit the relevant moving image file requested by the first terminal to the first terminal under a current state. Of course, since a communication environment improves after the server transmits the moving image files requested by the second terminal and the third terminal to the second terminal and the third terminal completely, the server may transmit the relevant moving image file to the first terminal. However, though example description has been made where only three terminals of the first terminal, the second terminal, and the third terminal access the server in order to describe the present invention, the server may be requested by many terminals to transmit specific moving image files and simultaneously perform multiple transcoding operations greater than the above embodiment in an actual communication environment. Therefore, the server may effectively control the first transcoding operation, the second transcoding operation, and the third transcoding operation in order to transmit the specific moving image file requested by the first terminal to the first terminal.

Three graphs 505, 506, and 507 in FIG. 5B illustrate an embodiment of matching output frame rate values generated as a result of respective transcoding operations. In the above-described example, an output frame rate value generated as a result of the second transcoding operation and the third transcoding operation has a frame rate value greater than the minimum output frame rate value, but an output frame rate value generated as a result of the first transcoding operation has a frame rate value less than the minimum output frame rate value. Therefore, the server controls respective output frame rate values to match the respective output frame rate values with 50 frames. More specifically, the server reduces 80 frames generated as a result of the third transcoding operation by 30 frames, and adds the reduced 30 frames to 20 frames generated as a result of the first transcoding operation, thereby controlling 20 frames to 50 frames. Therefore, the server lowers an occupy ratio allocated to the third terminal a little and increases an occupy ratio allocated to the first terminal where communication is not swift to uniformly transmit the moving image files requested by the relevant terminals to the first terminal, the second terminal, and the third terminal, respectively.

Figure 6:
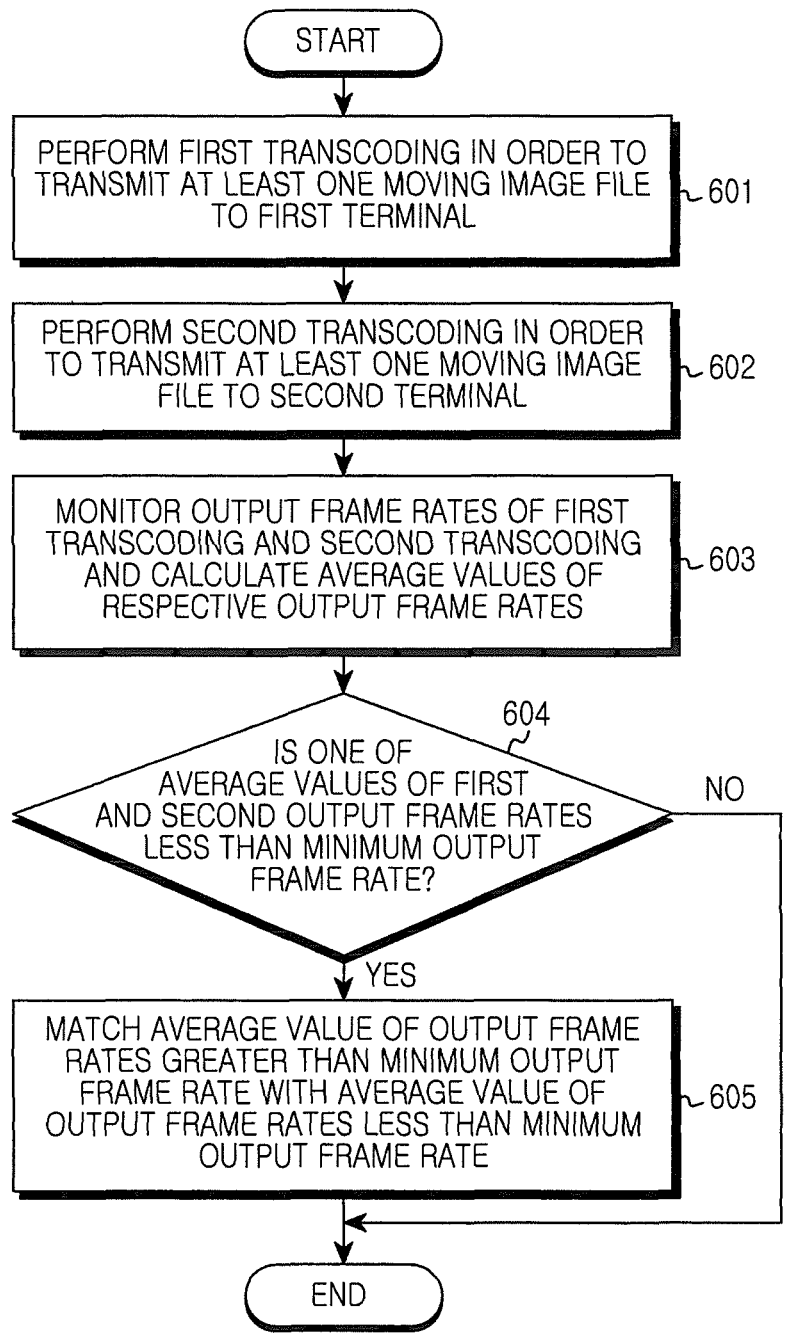
FIG. 6 illustrates an example method for operating a server according to an embodiment of the present invention.

FIG. 6 illustrates an example method for operating a server according to an embodiment of the present invention. As illustrated in FIG. 6, the server performs first transcoding operation in order to transmit at least one moving image to the first terminal first in step 601. More specifically, when the server is requested by the first terminal to transmit at least one moving image file, the server determines detailed information of the moving image file requested by the first terminal, and when determining that the format of a stored moving image file does not coincide with the format of the first terminal, the server starts the first transcoding operation in order to match the format of the stored moving image file with the format of the first terminal.

After that, the server performs second transcoding operation in order to transmit at least one moving image to the second terminal in step 602. More specifically, when requested by the second terminal to transmit at least one moving image file while performing the first transcoding operation, the server determines detailed information of the requested moving image file, and when determining that the format of a stored moving image file does not coincide with the format of the second terminal, performs the second transcoding operation in order to match the format of the stored moving image file with the format of the second terminal.

The server performs multiple transcoding operations, and simultaneously monitors output frame rates of the first transcoding operation and the second transcoding operation to calculate an average value of the respective output frame rates in step 603. More specifically, the server monitors an output frame rate generated as a result of respective transcoding in real-time to calculate an average value of respective output frame rates within a time specified by a user. Since a substantial value of an output frame rate changes in real-time depending on a communication environment, the server calculates an average value thereof to use the calculated average value as respective output frame rate values.

After monitoring output frame rates of the first transcoding operation and the second transcoding operation to calculate average values of respective output frame rates, the server determines whether one of the average values of the first output frame rate and the second output frame rate is less than a minimum output frame rate in step 604. Here, the minimum output frame rate denotes a minimum value of an output frame rate for transmitting a requested moving image file to a terminal that has requested at least one moving image file. That is, in the case where an output frame rate generated as a result of transcoding in the server is less than the minimum output frame rate, the server cannot transmit the relevant moving image file to the terminal that has requested the specific moving image file. Therefore, the server determines whether the above calculated average values of the respective output frame rates are less than the specified minimum output frame rate value in order to determine whether the server can transmit the specific moving image files requested by the first terminal and the second terminal to the relevant terminals, respectively.

When determining that one of the averages of the first output frame rates and the second output frame rates is less than the minimum output frame rate, the server allows an average of the output frame rates greater than the minimum output frame rate to match with an average of the output frame rates less than the minimum output frame rate in step 605. More specifically, the server compares the minimum output frame rate with the calculated averages of the respective output frame rates, when determining that one of the calculated output frame rates is less than the minimum output frame rate, reduces a size of a portion of the output frame rate determined greater than the minimum output frame rate by a rate specified by a user, and in contrast, increases a size of a portion of the output frame rate determined less than the minimum output frame rate by the reduced rate. In the above example, when determining that all of the averages of output frame rates generated as a result of the first transcoding operation and the second transcoding operation are greater than the minimum output frame rate, the server may control the respective output frame rates to be the same value. For example, suppose that the minimum output frame rate is 30 frames, an average of output frame rates as a result of the first transcoding operation is 80 frames, and an average of output frame rates as a result of the second transcoding operation is 60. The server may control the respective output frame rates to match the average value of the output frame rates generated as a result of the first transcoding operation with the average value of the output frame rates generated as a result of the second transcoding operation, so that the average values are controlled to 70 frames. That is, the server may uniformly generate the output frame rates to all terminals connected to the server. Also, in the case where the server is requested by the third terminal and the fourth terminal to transmit a moving image file, the server performs third transcoding operation and fourth transcoding operation, of course. In the conventional art, where a server is requested by a plurality of terminals to transmit at least one moving image file and performs multiple transcoding operations, there has been non-uniformity in respective output frame rates. More specifically, since an amount of operations of transcoding that can be performed by the server is limited, while an amount of operations required by respective terminals is not constant, output frame rates generated as a result of respective transcoding have not been uniform in the server. However, according to the present invention, the server controls respective output frame rates generated as a result of a plurality of transcoding to be uniform, thereby efficiently distributing an operation of transcoding.

Figure 7:
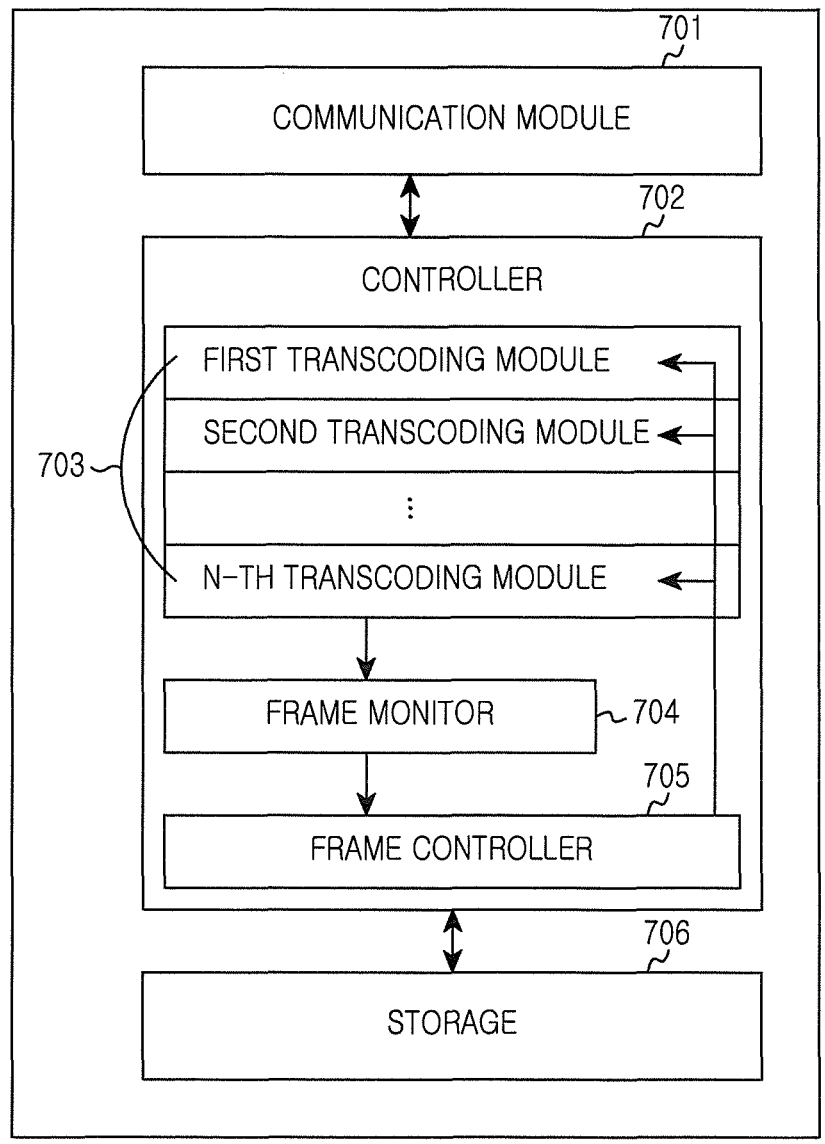
FIG. 7 illustrates an example server according to an embodiment of the present invention.

FIG. 7 illustrates an example server according to an embodiment of the present invention. As illustrated in FIG. 7, the server may include a communication module 701, a controller 702, and a storage 706. According to the present invention, the controller 702 may include multiple transcoding modules 703, a frame monitor 704, and a frame controller 705.

For voice and data communication, the communication module 701 processes a signal transmitted/received via an antenna. For example, the communication module 701 transmits a moving image file to a first terminal and a second terminal, and is requested by the first terminal to transmit at least one moving image file.

The transcoding modules 703 perform first transcoding in order to transmit at least one moving image file to the first terminal, and is requested by the second terminal to transmit at least one moving image file while performing the first transcoding, and performs the second transcoding in order to transmit the requested moving image file to the second terminal. Also, the transcoding module 703 includes a data buffer (not shown). The data buffer is a data region for storing data output generated by a transcoding operation.

The frame monitor 704 denotes a module for analyzing and monitoring an output frame rate by respective transcoding modules, and transfers the monitored frame rate to the frame controller 705. For example, the frame monitor 704 monitors output frame rates of the first transcoding and the second transcoding being performed for a specified time.

The frame controller 705 receives monitoring results from the frame monitor 704 to calculate average values of respective output frame rates of the first transcoding and the second transcoding, compares the calculated respective averages with a minimum output frame rate, and determines whether one of the average values is less than the minimum output frame rate. Also, when determining that one of the average values is less than the minimum output frame rate, the frame controller 705 reduces a size of a portion of the average value of the output frame rates greater than the minimum output frame rate by a specified rate, and increases a size of a portion of the average value of the output frame rates less than the minimum output frame rate by the reduced size. Also, the frame controller 705 repeats an operation such that the specified rate is automatically controlled and the average value of the output frame rates greater than the minimum output frame rate matches with the average value of the output frame rates less than the minimum output frame rate.

The storage 706 may include a program storage for storing a program for controlling an operation of the server, and a data storage for storing data generated during execution of programs.

In the above-described block configuration, the controller 702 may perform an overall function of the server. Separate configuration and illustration of the controller 702 in the present invention is for separately describing each function. Therefore, in actual realization of a product, all or some of the functions of the server may be processed by the controller 702.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a server, the method comprising:
   performing a first transcoding operation for transcoding a first data that is requested from a first terminal;
   performing a second transcoding operation for transcoding a second data that is requested from a second terminal while performing the first transcoding operation;
   calculating average values of output frame rates of the first transcoding operation and output frame rates of the second transcoding operation to compare the calculated average value with a minimum output frame rate;
   determining whether one of the average values is less than the minimum output frame rate; and
   when determining one of the average values is less than the minimum output frame rate,
      reducing a portion size of an average value of the output frame rates greater than a minimum output frame rate by a specified rate; and
      increasing a portion size of the average value of the output frame rates less than the minimum output frame rate by the reduced size.

2. The method of claim 1, wherein the performing of the first transcoding operation comprises:
   determining detailed information of the first data; and
   determining that a format of the first data is different from a format of a stored first data.

3. The method of claim 1, wherein the performing of the second transcoding operation comprises:
   determining detailed information of the second data; and
   determining that a format of the second data is different from a format of a stored second data.

4. The method of claim 1, wherein the format of the first data and the second data comprises at least one of a type of CODEC, an image size, or a bit rate.

5. The method of claim 1, wherein the second terminal comprises a plurality of terminals.

6. The method of claim 1, wherein the reduced average value of the output frame rate is equal to the increased average value of the output frame rate.

7. The method of claim 1, wherein the minimum output frame rate comprises a minimum value of an output frame rate required for transmitting data to a terminal that has requested the data.

8. An electronic device comprising:
   a controller configured to perform a first transcoding operation for transcoding a first data that is requested from a first terminal, perform a second transcoding operation for transcoding a second data that is requested from a second terminal while performing the first transcoding operation, calculate average values of output frame rates of the first transcoding operation and output frame rates of the second transcoding operation to compare the calculated each average value with a minimum output frame rate, determine whether one of the average values is less than the minimum output frame rate, and when determining one of the average values is less than the minimum output frame rate, reduce a position size of an average value of output frame rate greater than the minimum output frame rate by a specified rate, and increase a portion size of an average value of output frame rates less than the minimum output frame rate by the reduced size; and
   a communication module configured to transmit the first data to the first terminal and the second data to the second terminal.

9. The device of claim 8, wherein the controller determines detailed information of the first data, and determines that a format of the first data is different from a format of a stored first data.

10. The device of claim 8, wherein the controller determines detailed information of the second data, and determines that a format of the second data is different from a format of a stored second data.

11. The device of claim 8, wherein the format of the first data and second data comprises at least one of a type of CODEC, an image size, or a bit rate.

12. The device of claim 8, wherein the second terminal comprises a plurality of terminals.

13. The device of claim 8, wherein the reduced average value output frame rate is equal to the increased average value of the output frame rate.

14. The device of claim 8, wherein the minimum output frame rate comprises a minimum value of an output frame rate required for transmitting the data to a terminal that has requested the data.

* * * * *